(12) United States Patent
Khan et al.

(10) Patent No.: US 11,301,969 B1
(45) Date of Patent: Apr. 12, 2022

(54) CONTEXT AWARE DYNAMIC DISTORTION CORRECTION

(71) Applicant: Apple Inc., Cupertino, CA (US)

(72) Inventors: Moinul Khan, San Diego, CA (US); Simon Fortin-Deschenes, Sunnyvale, CA (US); Yanli Zhang, Los Altos, CA (US); Bennett S. Wilburn, Saratoga, CA (US); Sterling G. Orsten, Santa Clara, CA (US); Nan Zhu, San Jose, CA (US); James Zhou, Pleasanton, CA (US)

(73) Assignee: Apple Inc., Cupertino, CA (US)

(*) Notice: Subject to any disclaimer, the term of this patent is extended or adjusted under 35 U.S.C. 154(b) by 183 days.

(21) Appl. No.: 16/575,994

(22) Filed: Sep. 19, 2019

Related U.S. Application Data

(60) Provisional application No. 62/737,967, filed on Sep. 28, 2018.

(51) Int. Cl.
| G06T 5/00 | (2006.01) |
| G02B 27/01 | (2006.01) |
| G02B 27/00 | (2006.01) |
| G06T 19/00 | (2011.01) |
| G06F 3/01 | (2006.01) |

(52) U.S. Cl.
CPC .......... *G06T 5/006* (2013.01); *G02B 27/0093* (2013.01); *G02B 27/0172* (2013.01); *G06F 3/013* (2013.01); *G06T 19/006* (2013.01); *G02B 2027/011* (2013.01); *G02B 2027/0138* (2013.01)

(58) Field of Classification Search
None
See application file for complete search history.

(56) References Cited

U.S. PATENT DOCUMENTS

| 9,836,828 | B2 | 12/2017 | Jones et al. | |
| 10,271,042 | B2* | 4/2019 | Rougeaux | H04N 13/344 |
| 2011/0169928 | A1* | 7/2011 | Gassel | H04N 13/344 |
| | | | | 348/53 |
| 2016/0091720 | A1* | 3/2016 | Stafford | G02B 27/0093 |
| | | | | 345/8 |
| 2017/0285343 | A1 | 10/2017 | Belenkii et al. | |
| 2017/0295353 | A1 | 10/2017 | Hwang et al. | |
| 2018/0096453 | A1 | 4/2018 | Edwards et al. | |
| 2018/0114298 | A1* | 4/2018 | Malaika | G02B 27/017 |
| 2021/0088793 | A1* | 3/2021 | Tominaga | G02B 27/02 |

* cited by examiner

*Primary Examiner* — Jwalant Amin

(74) *Attorney, Agent, or Firm* — Thompson Hine LLP (57) ABSTRACT

Some implementations provide improved user experiences on head mounted devices (HMDs) that provide near eye viewing, e.g., HMDs that display distorted images and provide lenses that undistort the images for the user. The images are produced using distortion that is corrected dynamically based on context to conserve device resources. To do so, a context associated with a state of the user, the HMD, or content being viewed on the HMD is tracked during the user experience. For example, the device may predict pupil position, eye state, eye gaze direction, or eye fixation, content type, connection mode, and other context. The device uses the tracked context to determine how to correct distortion for the images at different points during the user experience. For example, new distortion corrections may be computed and used while the user's gaze is moving and previously-determined distortion corrections may be used while the user's gaze is fixed.

20 Claims, 7 Drawing Sheets

CONTEXT AWARE DYNAMIC DISTORTION CORRECTION

CROSS-REFERENCE TO RELATED APPLICATION

This application claims the benefit of U.S. Provisional Application Ser. No. 62/737,967 filed Sep. 28, 2018, which is incorporated herein in its entirety.

TECHNICAL FIELD

The present disclosure generally relates to providing user experiences on head mounted devices (HMDs), and in particular, to systems, methods, and devices for correcting distortion in images provided on such devices.

BACKGROUND

Head mounted devices (HMDs) present images that are viewed by the eyes of users at relatively close range. Directly focusing on such close range images is undesirable or impossible for most users. To ease the burden on the users' eyes, HMDs typically present images that are warped or otherwise distorted and provide lenses that provide the users with undistorted views of those images. The lenses undistort the images presented on the displays for near eye viewing, e.g., bending the light from the displays that are relatively close to the users' eyes to make it easier for the users to focus on and see the images presented on the displays as if the users were looking at objects further away from the users' eyes. The amount of distortion in the images can vary with the strength of the lens, e.g., smaller displays may use more powerful lenses and thus require greater distortion.

The user experience of viewing images through HMD lenses is often imperfect, e.g., including chromatic or geometric aberrations caused by misalignment of a user's eye with the optical axis of the lens or due to the eye relief being different from the eye relief assumed by the calibration. For example, as users look around at different portions of the displays, the distortion of the images may not be appropriate, potentially causing nausea or discomfort to the users. Various distortion correction techniques attempt to adjust the distorted images to improve the quality of the user experience, e.g., how the user views the images through the lenses.

SUMMARY

Various implementations disclosed herein include devices, systems, and methods that provide improved user experiences on HMDs. Implementations involve an HMD that has one or more displays that display distorted images and that has one or more lenses that undistort the distorted images for near eye viewing. The images are distorted using distortion (e.g., distortion meshes) that is adjusted or otherwise customized for particular eye characteristics. For example, a distortion may be initially determined based on the characteristics of the display, the lens, and the relationship between them and a general or default circumstance such as the user's pupil position or gaze direction aligning with the optical axis of the lens. The initial distortion may be corrected (e.g., improved) before being used to create the individual distorted images. In another example, rather than modifying a single distortion, multiple default distortion meshes are determined and a corrected distortion is determined by interpolating between them. Correcting the distortion can involve tracking eye characteristics and correcting a respective distortion (e.g., distortion mesh) for each of the images. For example, for a given image, the distortion can be determined by obtaining a default distortion and correcting the distortion based on the user's pupil position at the time when the image is to be displayed. The current image distorted using the corrected distortion is then displayed. This distortion correction may provide a more consistent or otherwise better user experience, particularly in circumstances in which the user's eye changes alignment with the optical axis of the lens, when the HMD shifts on the user's head, when a display moves relative to the HMD's eyepiece, etc. However, computing the distortion correction for each image of the user experience can require significant processing, memory, and power resources.

Various implementations disclosed herein include devices, systems, and methods that correct distortion dynamically based on context to more efficiently use processing, memory, and power resources. These distortion correction techniques have several advantages over existing techniques that perform the same distortion correction computations in the same way for every image during the user experience. In contrast, some implementations disclosed herein selectively perform distortion correction computations for less than every image to be provided on the HMD based on the current context of the user experience. This may reduce the overall distortion correction computation required during the user experience. Some implementations adjust the distortion correction computations for selected images, for example, performing a more computationally-intensive distortion correction computation for some of the images and performing a less computationally-intensive distortion correction computation for others of the images based on the context at different times during the user experience. Reducing the amount or complexity of the distortion correction computations can conserve system processing, memory, and power resources, providing significant advantages over existing devices, systems, and methods.

One exemplary implementation disclosed herein involves performing operations at a device with one or more processors and a computer-readable storage medium. The device provides a user experience on a head mounted device (HMD). The user experience includes images displayed on a display of the HMD and viewed through a lens of the HMD. The device tracks a context associated with a state of the user, the HMD, or content being viewed on the HMD during the user experience. For example, the device may track the context by predicting pupil position, eye state, eye gaze direction, or eye fixation based on monitoring the eye. In another example, the device tracks the context by tracking the type of the content in the images (e.g., identifying that the content is an action movie, virtual reality (VR) content, a game, mixed reality (MR) content, etc.) or other characteristics (e.g., brightness) of the content in the images. In another example, the device tracks the context by tracking dynamic focus related to movement of the display, use of a tunable lens, or other factors that may have an impact on distortion. In another example, the device tracks the context using sensors on the HMD (e.g., noise sensors, motion sensors, etc.). In another example, the device tracks the context by determining whether the HMD or another device (e.g., a separate controller) is currently providing the experience or performing the distortion correction computations.

The device determines distortion for the images based on a relationship between a lens and a display of the HMD and corrects the distortion based on context during the user experience. The distortion is thus corrected during the user experience based on the context, e.g., corrected differently from one another or not at all at different times during the user experience when the user's pupil location is fixed, moving, etc. or if the user's gaze is fixed, moving, etc. If a steady pupil position or gaze direction is detected, for example, the device may use a prior image's distortion correction or a default distortion correction rather than computing a new distortion correction for the current image. In another example, the device may determine to apply different distortion correction techniques for different images based on their respective contexts. For example, distortion associated with images to be displayed while the user's gaze is fixed may be corrected using a less computationally-intensive correction technique than the distortion of other images.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that provide improved user experiences on HMDs. Implementations involve an HMD that includes one or more lenses that undistort images presented on one or more displays for near eye viewing. Some implementations establish a correction-function to be applied to images so that an image viewed through a lens (which has lens-distortion) will look accurate to a user. The level of correction that is applied and whether a correction is applied may depend upon the context.

Some implementations involve a distortion correction technique that provides better distorted images, e.g., images in which the distortion is corrected to be appropriate for the particular context of the particular image to be displayed. To do so, a device tracks a context associated with a state of the user, the HMD, or content being viewed on the HMD during the user experience and applies distortion corrections to correct the distortion of the images to be displayed on the display and viewed through a lens of the HMD during the user experience. These distortion corrections are adaptively determined during the user experience based on the context, for example, based on a prediction that the user's gaze is fixed rather than moving.

The phrase "user experience" as used herein refers to what the user sees when the user looks through the one or more lenses of the HMD at content presented on the one or more displays of the HMD. For example, content, such as a movie, series of virtual reality (VR) images, or series of mixed reality (MR) images may be presented on the HMD. The substance of that content may be consistent (e.g., the underlying movie frames are the same for different users and contexts). However, the user experience may be different for different users and contexts. Specifically, the distorted images rendered on the display for different contexts may differ depending on the user's pupil position, gaze direction, etc. Thus, for example, given a fixed movie frame of content, if the user is looking to the left side of the display, a distorted image of the movie frame may be different than a distorted image of the movie frame that would be displayed if the user was looking to the right side of the display.

The phrase "image" as used herein refers to the content that is displayed on some or all of a display space. It is noted that a user experience can involve a sequence of images presented over time on a display. Each image may replace a some or all of a previously-displayed image in the sequence, e.g., according to a frame rate. In some implementations, an image entirely replaces a prior image in the sequence in the display space of the display. In some implementations, an image replaces only a portion of the display space and some or all of the remaining potions of the display space are occupied by content from a prior image in the sequence or occupied by content viewed through a see-through display.

As used herein, the phrase "context" refers to any tracked or predicted characteristic of the user eye(s) or other body part(s), characteristic of content in images displayed or to be displayed, or characteristic of one or more devices that are used. Context can include, but is not limited to, the user's pupil position(s), eye gaze direction(s), eye movement(s), eye fixation, etc. Context can include, but is not limited to, content type (e.g., action, drama, comedy, video game, real, virtual, etc.) content consistency (e.g., rapidly changing, scene changing, etc.). Context can include, but is not limited to, movement of a device or part of a device, e.g., a display, use of a tunable lens, or other device characteristics and/or states that may have an impact on distortion. Context can include, but is not limited to, characteristics that are tracked by device sensors such as audio or visual characteristics of the content, the real world surrounding, or produced by the user. Context can include, but is not limited to, motion of the device or user of the device. Context can include characteristics of the one or more devices that may be involved in providing a user experience, including, but not limited to the number and types of devices involved in providing the user experience, the characteristics of such devices, and how such devices are configured to communicate with one another or otherwise configured to provide the user experience, e.g., how the devices are coordinating to provide distortion corrections.

Figure 1:
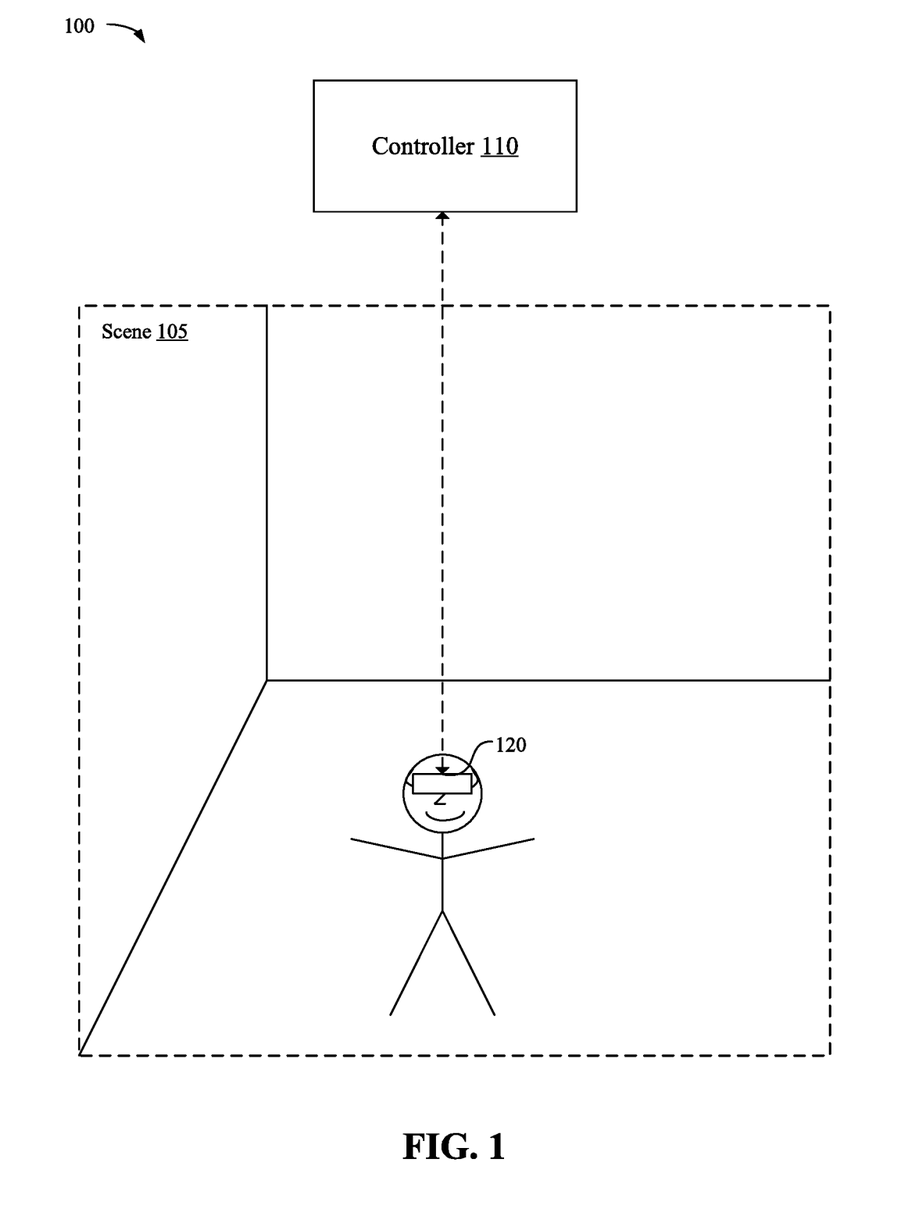
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some implementations, the controller 110 is configured to manage and coordinate a user experience for a user. In some implementations, the controller 110 is a base or external compute device. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. In one example, the controller 110 is a local server or other device located within the scene 105. In another example, the controller 110 is a remote server or other device located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present the user experience to the user. In some implementations, the HMD 120 includes a suitable combination of software, firmware, and/or hardware. In some implementations, the user wears the HMD 120 on his/her head. As such, the HMD 120 includes one or more displays provided to display images. The HMD 120 may enclose the field-of-view of the user. The HMD 120 is described in greater detail below with respect to FIG. 3. In some implementations, the functionalities of the controller 110 are provided by and/or combined with the HMD 120, for example, into a HMD.

According to some implementations, the HMD 120 presents a MR experience to the user while the user is virtually and/or physically present within the scene 105. The phrases "virtual reality" and "VR" refer to an experience that replaces the user's view of the real world with virtual content. The phrases "augmented reality" and "AR" refer to an experience that combines virtual information or objects on or with real world content. The phrases "mixed reality" and "MR" refer to an experience that includes any combination of virtual content and real content. Accordingly, VR and AR can be considered subsets of MR. In some implementations, while presenting a user experience, the HMD 120 is configured to present MR content and to enable optical see-through of at least a portion of the scene 105. In some implementations, while presenting a user experience, the HMD 120 is configured to present MR content and to enable video pass-through of the scene 105.

Figure 2:
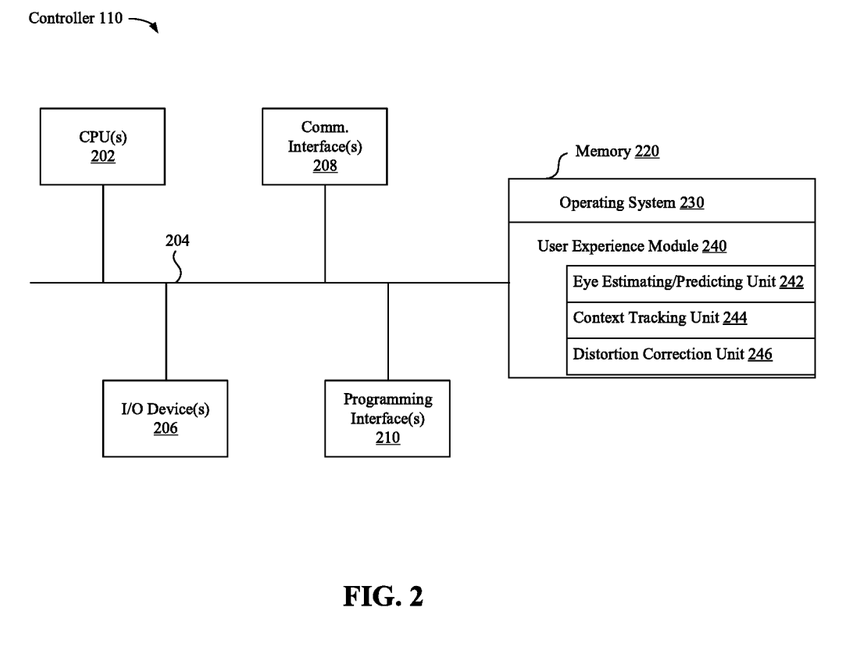
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a user experience module 240.

The operating system 230 includes procedures for handling various basic system services and for performing hardware dependent tasks. In some implementations, the user experience module 240 is configured to manage and coordinate one or more user experiences for one or more users (e.g., a single user experience for one or more users, or multiple user experiences for respective groups of one or more users). The user experience module 240 can be configured to facilitate context aware dynamic distortion correction. To that end, in various implementations, the user experience module 240 includes an eye estimating/predicting unit 242, a context tracking unit 244, and a distortion correction unit 246.

In some implementations, the eye estimating/predicting unit 242 is configured to obtain data (e.g., eye tracking data, interaction data, sensor data, location data, etc.) from at least the HMD 120 and to use that data to provide estimations or predictions of eye characteristics, e.g., pupil location, gaze direction, etc. To that end, in various implementations, the eye estimating/predicting unit 242 includes instructions and/or logic therefor, and heuristics and metadata therefor.

In some implementations, the context tracking unit 244 is configured to obtain data (e.g., eye tracking data, content data, interaction data, sensor data, location data, etc.) from at least the HMD 120 and to use that data to estimate or predict the context of a user experience occurring on the HMD 120. To that end, in various implementations, the context tracking unit 244 includes instructions and/or logic therefor, and heuristics and metadata therefor.

In some implementations, the distortion correction unit 246 is configured to use eye characteristics and/or context estimates and predictions to determine distortion corrections for a user experience occurring on the HMD 120. To that end, in various implementations, the distortion correction unit 246 includes instructions and/or logic therefor, and heuristics and metadata therefor.

Although the eye estimating/predicting unit 242, context tracking unit 244, and distortion correction unit 246 are shown as residing on a single device (e.g., the controller 110), it should be understood that in other implementations, any combination of these units may be located in separate computing devices.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
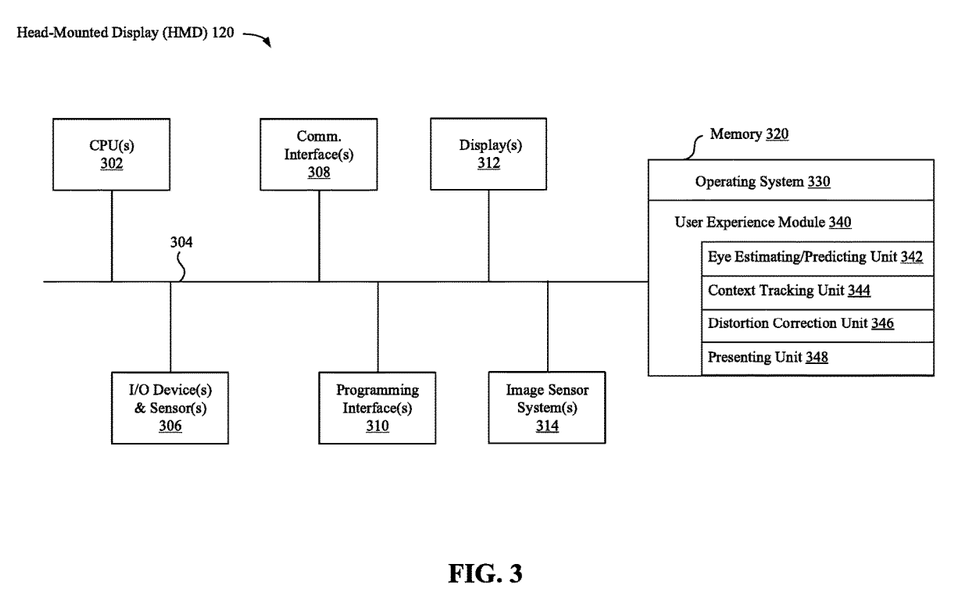
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like. In some implementations, one or more of these I/O devices and sensors 306, such as the IMU, is used to track context. One example application, turns on dynamic distortion correction during high acceleration periods identified by an IMU, because such acceleration may indicate that the device might move relative to the user's face/eyes.

In some implementations, the one or more displays 312 are configured to present a user experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), a retinal projection system, and/or the like display types. In some implementations, the one or more displays 312 correspond to diffractive, reflective, polarized, holographic, etc. waveguide displays. In one example, the HMD 120 includes a single display. In another example, the HMD 120 includes a display for each eye of the user. In some implementations, the one or more displays 312 are capable of presenting MR content, including VR or AR content. Note that the amount of distortion can be intrinsic to the one or more displays 312, for example, to the projector system in some projection systems. In some systems, it will not change based on eye position or other eye characteristics, for example, for the projection lens part of a DLP projector.

In some implementations, the one or more image sensor systems 314 are configured to obtain image data that corresponds to at least a portion of the face of the user that includes the eyes of the user. For example, the one or more image sensor systems 314 include one or more RGB camera (e.g., with a complimentary metal-oxide-semiconductor (CMOS) image sensor or a charge-coupled device (CCD) image sensor), monochrome camera, IR camera, event-based camera, and/or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a user experience module 340.

The operating system 330 includes procedures for handling various basic system services and for performing hardware dependent tasks. In some implementations, the user experience module 340 is configured to present a user experience that utilizes context aware dynamic distortion correction to the user via the one or more displays 312. To that end, in various implementations, the user experience module 340 includes eye estimating/predicting unit 342, a context tracking unit 344, a distortion correction unit 346, and a presenting unit 348.

In some implementations, the eye estimating/predicting unit 342 is configured to obtain data (e.g., eye tracking data, interaction data, sensor data, location data, etc.) and to use that data to provide estimations or predictions of eye characteristics, e.g., pupil location, gaze direction, etc. To that end, in various implementations, the eye estimating/predicting unit 342 includes instructions and/or logic therefor, and heuristics and metadata therefor.

In some implementations, the context tracking unit 344 is configured to obtain data (e.g., eye tracking data, content data, interaction data, sensor data, location data, etc.) and to use that data to estimate or predict the context of a user experience occurring on the HMD 120. To that end, in various implementations, the context tracking unit 344 includes instructions and/or logic therefor, and heuristics and metadata therefor.

In some implementations, the distortion correction unit 346 is configured to use eye characteristics and/or context estimates and predictions to determine distortion corrections for a user experience occurring on the HMD 120. To that end, in various implementations, the distortion correction unit 346 includes instructions and/or logic therefor, and heuristics and metadata therefor.

In some implementations, the presenting unit 348 is configured to present content (e.g., images distorted according to the corrected distortion from distortion correction unit 246 of controller 110 and/or distortion correction unit 346) via the one or more displays 312. To that end, in various implementations, the presenting unit 348 includes instructions and/or logic therefor, and heuristics and metadata therefor.

Although the eye estimating/predicting unit 342, context tracking unit 344, distortion correction unit 346, and presenting unit 348 are shown as residing on a single device (e.g., the HMD 120), it should be understood that in other implementations, any combination of these units may be located in separate computing devices.

Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
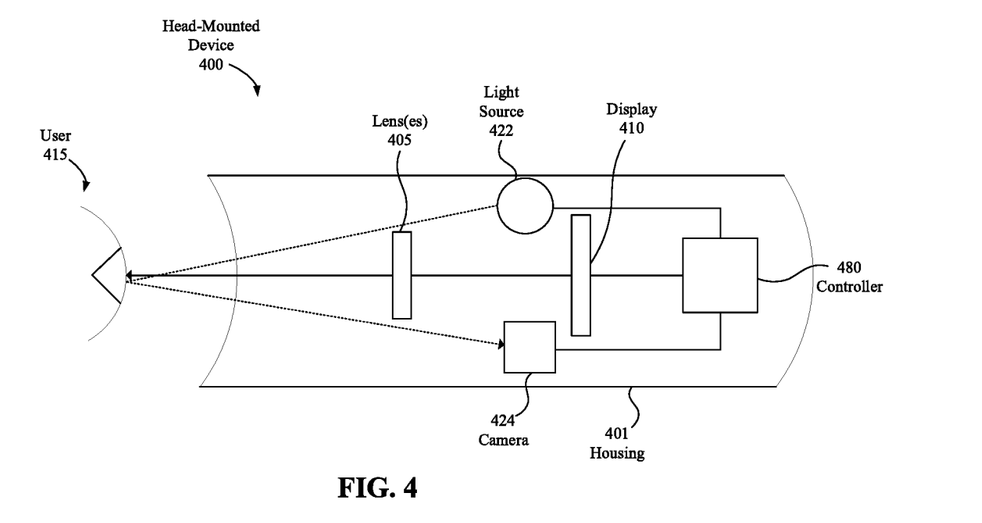
FIG. 4 is a block diagram of an example head-mounted device (HMD) in accordance with some implementations.

FIG. 4 illustrates a block diagram of another exemplary head-mounted device 400 in accordance with some implementations. The head-mounted device 400 includes a housing 401 (or enclosure) that houses various components of the head-mounted device 400. The housing 401 includes (or is coupled to) an eye pad (not shown) disposed at a proximal (to the user 415) end of the housing 401. In various implementations, the eye pad is a plastic or rubber piece that comfortably and snugly keeps the head-mounted device 400 in the proper position on the face of the user 415 (e.g., surrounding the eye of the user 415).

The housing 401 houses a display 410 that displays an image, emitting light towards or onto the eye of a user 415. In various implementations, the display 410 emits the light through an eyepiece having one or more lenses 405 that refracts the light emitted by the display 410, making the display appear to the user 415 to be at a virtual distance farther than the actual distance from the eye to the display 410. For the user to be able to focus on the display 410, in various implementations, the virtual distance is at least greater than a minimum focal distance of the eye (e.g., 7 cm). Further, in order to provide a better user experience, in various implementations, the virtual distance is greater than 1 meter. In some implementation, the focal plane may additionally or alternatively vary according to where the user is gazing.

The housing 401 also houses a tracking system including one or more light sources 422, camera 424, and a controller 480. The one or more light sources 422 emit light onto the eye of the user 415 that reflects as a light pattern (e.g., a circle of glints) that can be detected by the camera 424. Based on the light pattern, the controller 480 can determine an eye tracking characteristic of the user 415. For example, the controller 480 can determine a gaze direction and/or a blinking state (eyes open or eyes closed) of the user 415. As another example, the controller 480 can determine a pupil center, a pupil size, or a point of regard. Thus, in various implementations, the light is emitted by the one or more light sources 422, reflects off the eye of the user 415, and is detected by the camera 424. In various implementations, the light from the eye of the user 415 is reflected off a hot mirror or passed through an eyepiece before reaching the camera 424.

The display 410 emits light in a first wavelength range and the one or more light sources 422 emit light in a second wavelength range. Similarly, the camera 424 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 415 selects an option on the display 410 by looking at it), provide foveated rendering (e.g., present a higher resolution in an area of the display 410 the user 415 is looking at and a lower resolution elsewhere on the display 410), or correct distortion (e.g., for images to be provided on the display 410).

In various implementations, the one or more light sources 422 emit light towards the eye of the user which reflects in the form of a plurality of glints.

In various implementations, the camera 424 is a frame/shutter-based camera that, at a particular point in time or multiple points in time at a frame rate, generates an image of the eye of the user 415. Each image includes a matrix of pixel values corresponding to pixels of the image which correspond to locations of a matrix of light sensors of the camera.

In various implementations, the camera 424 is an event camera comprising a plurality of light sensors (e.g., a matrix of light sensors) at a plurality of respective locations that, in response to a particular light sensor detecting a change in intensity of light, generates an event message indicating a particular location of the particular light sensor.

Figure 5:
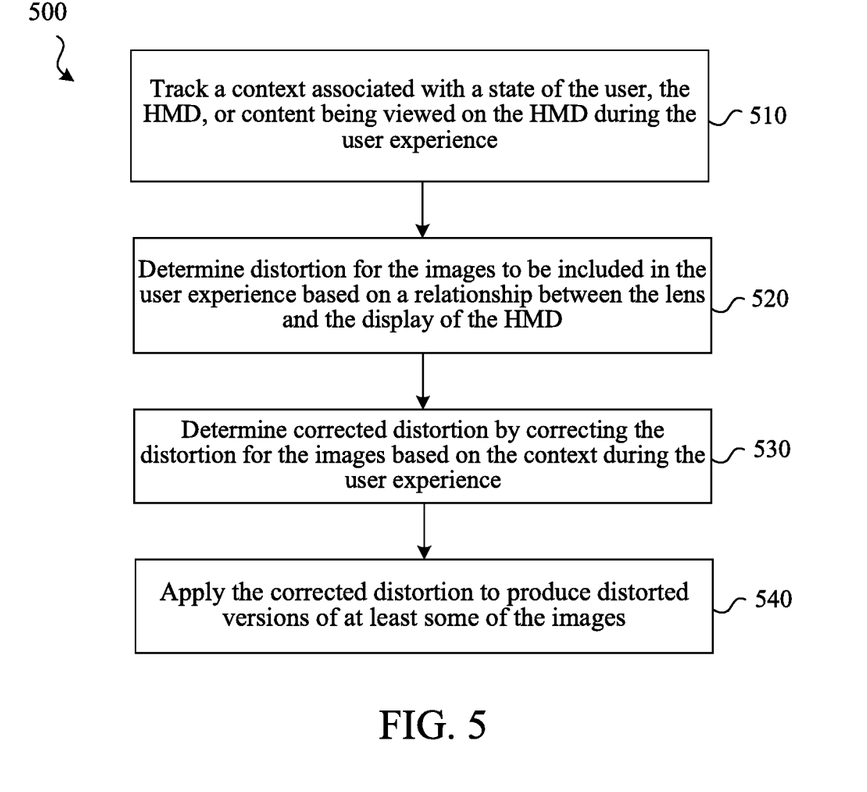
FIG. 5 is a flowchart representation of a method of context aware dynamic distortion correction in accordance with some implementations.

FIG. 5 is a flowchart representation of a method 500 of context aware dynamic distortion correction in accordance with some implementations. In some implementations, the method 500 is performed by a device (e.g., controller 110 of FIGS. 1 and 2), such as a mobile device, desktop, laptop, or server device). In these example, the device and the HMD are separate devices and the device may wirelessly receive the images from the HMD and/or transmit the images, distortion, distortion corrections, distorted images, or context to the HMD. In other implementations, the method 500 is performed on a device (e.g., HMD 120 of FIGS. 1 and 3) that has one or more displays for displaying images and thus some or all of the features of method 500 may be performed on the HMD itself. In some implementations, the method 500 is performed by processing logic, including hardware, firmware, software, or a combination thereof. In some implementations, the method 500 is performed by a processor executing code stored in a non-transitory computer-readable medium (e.g., a memory).

The user experience includes images (e.g., a sequence of frames or other images) displayed on at last a portion of a display space of a display of the HMD and viewed through one or more lenses of the HMD. For example, content, such as a movie, a sequence of images depicting three dimensional (3D) content, a series of virtual reality (VR) images, or a series of other mixed reality (MR) images may be presented on the HMD or provided to the HMD for presentation. The images may include any content that is displayed on some or all of a display space. Each image may replace some or all of a previous image in a sequence, e.g., according to a frame rate. In some implementations, an image entirely replaces a prior image in the sequence in the display space of the display. In some implementations, an image replaces only a portion of the display space and some or all of the remaining potions of the display space are occupied by content from a prior image in the sequence or seen through a see-through-display.

At block 510, the method 500 tracks a context associated with a state of the user, the HMD, or content being viewed on the HMD during the user experience. For example, the device may track the context by predicting pupil position, eye state, eye gaze direction, or eye fixation based on monitoring the eye. Based on an amount of gaze movement in a predetermined number of previous images, an amount of gaze movement expected in the next image can be predicted. In another example, a machine learning technique is used to predict context based on tracked eye data.

In another example, the device tracks the context by tracking the type of the content in the images (e.g., identifying that the content is an "action" movie, a shopping application, virtual reality (VR) content, a game, mixed reality (MR) content, etc.) or other characteristics (e.g., brightness) of the content in the images. Particular types of content may have been found based on statistical analysis, machine learning, or other learning technique to be associated with significant gaze movement, relatively fixed gaze movement, or other such characteristics that provide a useful context for determining how the correct the distortion for an image that is to be displayed.

In another example, the context includes a position, movement, or environment of the HMD. The device may track such context using sensors on the HMD (e.g., noise sensors, motion sensors, etc.).

In another example, the context is an eye prescription of the user, which may have been input to the device by the user, associated with a known, user profile, or determined by assessing the eye(s) of the user via sensors on the HMD.

Figure 6:
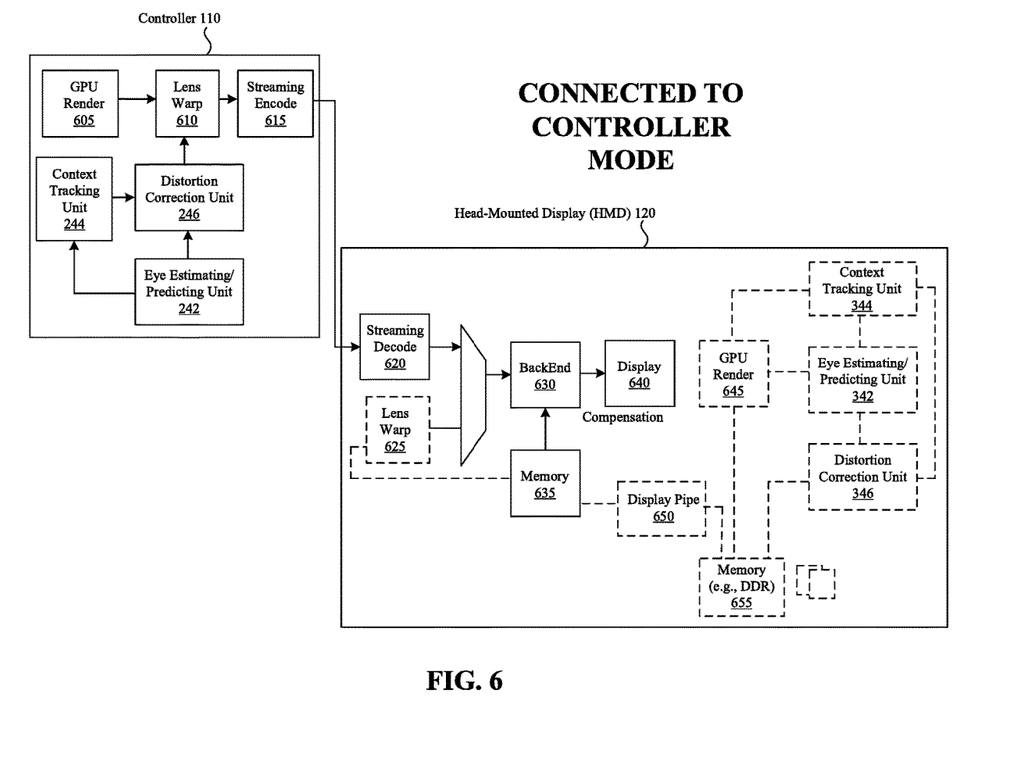
FIG. 6 is a block diagram of an example of context aware dynamic distortion correction in an HMD while in a connected-to-controller mode in accordance with some implementations.
Figure 7:
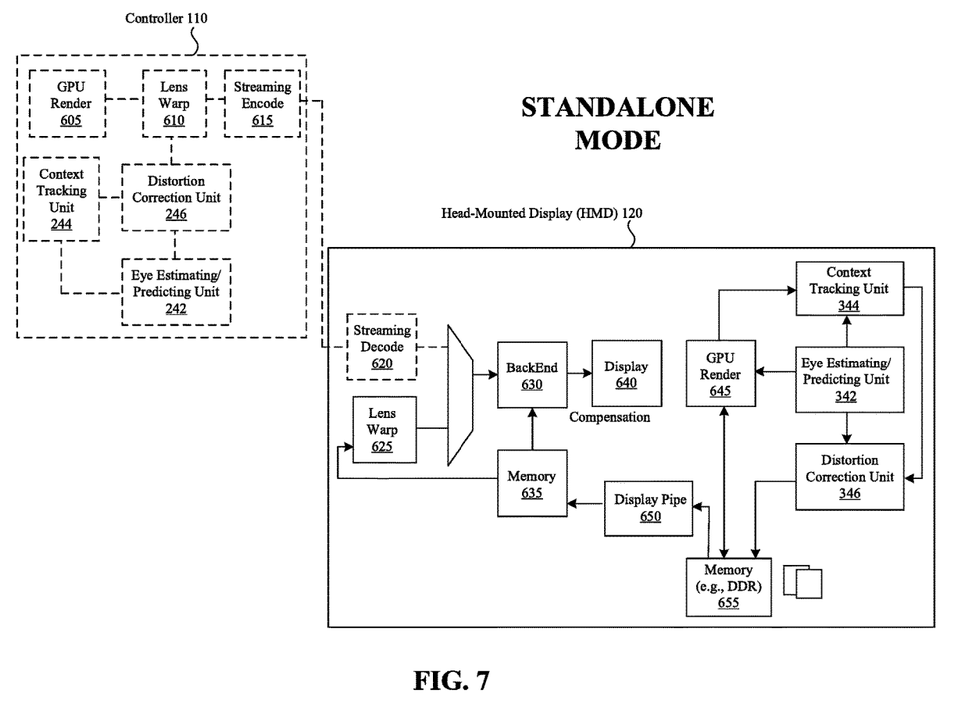
FIG. 7 is a block diagram of an example of context aware dynamic distortion correction in an HMD while in a stand-alone mode in accordance with some implementations.

In another example, the device tracks the context by determining whether the HMD or another device (e.g., a separate controller) is currently providing the experience or performing the distortion correction computations. The context may identify a connection mode of the HMD. The context may indicate a standalone mode or a connected-to-controller mode based whether the HMD is currently performing computations alone or is able to communicate with a separate device (e.g., controller 120) to perform some or all of the computations. For example, wherein the user experience may be provided by the HMD and a separate device at different times during the user experience and the context may be determined based on whether the HMD or the separate device is providing the user experience at particular points in time, e.g., for particular images of a sequence of images. FIGS. 6 and 7, discussed below, illustrate different connection modes.

At block 520, the method 500 determines distortion for images to be included in the user experience. The distortion is determined based on a relationship, e.g., distance, relative sizes, relative optical characteristics, etc., between the lens and a display of the HMD. In some implementations, the distortion is based on default eye characteristics (e.g., pupil position, eye center location, gaze direction aligned with optical axis of lens, etc.)

At block 530, the method 500 determines corrected distortion by correcting the distortion for the images based on the context during the user experience. The distortion corrections may be determined based on a change in the context during the user experience (e.g., the user's gaze changing from moving to fixed). In some implementation, correcting the distortion involves selectively computing distortion corrections for only a subset of fewer than all of the images. Thus, for example, rather than computing a distortion correction for each frame of a sequence of frames, the method may involve computing a distortion correction for a first frame, applying the corrected distortion in providing the first frame, predicting if the context requires (e.g., according to predetermined criteria) computing another distortion correction for the second frame, and, if not, applying a default distortion correction or the first frame distortion correction in presenting the second frame. For example, the context may include a prediction that the user's gaze will be fixed (e.g., involving less than a threshold amount of movement) for the second frame and thus the first frame distortion correction can be reused. Continuing this example, the method may subsequently predict that the context has changed and now requires computing a new distortion correction for the third frame, e.g., the context may include a prediction that the gaze will no longer be fixed for the third frame. Note that context can be determined for each image, every other image, every third image, or according to any other appropriate increment or context determination scheme.

In some implementations, rather than computing a distortion correction for every image, the method 500 determines to compute a distortion correction for a subset of less than all of the images. For images for which the distortion correction is not specifically computed, the method 500 uses a distortion correction intended to approximate the distortion correction that would have been computed. In one example, the method 500 uses a distortion correction from a prior image of the images (e.g., the correction from the immediately preceding image or an image having a similar context). In another example, the method 500 uses a default correction.

In some implementations, correcting the distortion involves applying different distortion correction techniques to different images, e.g., a first distortion correction technique is applied for the first image, a second (different) distortion correction technique is applied for the second image, etc. As a specific example, a first correction technique applied to a subset of the images may calculate a pupil position or an eye center and use that calculated pupil position/eye center to determine the correction, while a second correction technique applied to a different subset of the images uses a fixed (e.g., default) pupil position/eye center and uses that fixed pupil position/eye center to compute the correction. In this example, the second correction technique is less computationally intensive than the first computation since the second computation avoids the computations associated with determining the pupil position/eye center.

At block 540, the method 500 applies the corrected distortion to produce distorted versions of at least some of the images to be displayed on the display during the user experience. In some implementations, the distortion (original or corrected) include distortion meshes that are applied to undistorted images to produce the distorted versions of the images. Generally, each initial distortion or corrected distortion for an image of the user experience is applied to a corresponding image that is then rendered on some or all of the display space of the display or provided for rendering on some or all of the display space of the display.

FIGS. 6 and 7 illustrate distortion correction being performed by a system in different modes. FIG. 6 is a block diagram of an example of distortion correction in an HMD while in a connected-to-controller mode. In FIG. 6, the controller 110 includes a GPU render process 605 that provides images to a lens warp process 610, from which original distortion meshes for the images are determined. Some or all of these original distortion meshes are corrected based on the context. The eye estimating/predicting unit 242 provides eye estimates/predictions that may be used by the context tracking unit 244 to tracks the context of the user experience (e.g., whether the user's gaze is fixed or moving). The context and eye estimates/predictions are provided to the distortion correction unit 246 that uses this information to correct the distortion (e.g., determining distortion corrections for select images, selectively using different computation techniques, etc.). The context, distortion (original and/or corrected), the distortion corrections, the original images, and/or the distorted images are encoded by the streaming encode process 615 and transmitted to the HMD 120.

The HMD 120 receives and decodes the context, distortion (original and/or corrected), the distortion corrections, the original images, and/or the distorted images, which are processed by backend 630 using memory 635. Distorted images are ultimately displayed on display 640 and viewed through the device lens by the user. In this example, the distortion and distortion correction operations were performed on the controller. Accordingly, the lens warp process 625, the GPU render process 645, content tracking unit 344, eye-estimating/predicting unit 342, distortion correction unit 346, memory 655, and display pipe 650 are not used in providing the user experience. In this example, these resources are conserved while the HMD is in connected-to-controller mode.

FIG. 7 is a block diagram of an example of distortion correction in an HMD 120 while in a standalone mode. In FIG. 7, the controller 110 is not in communication with or otherwise not providing support to the HMD 120. Accordingly, in FIG. 7, the HMD 110 performs the adaptive distortion correction itself. The eye estimating/predicting unit 342 provides eye estimates/predictions that may be used by the context tracking unit 344 along with image data from the GPU render process 645 to track the context of the user experience (e.g., whether the user's gaze is fixed or moving). The context and eye estimates/predictions are also provided to the distortion correction unit 346 that uses this information to correct the distortion (e.g., determining distortion corrections for select images, selectively using different computation techniques, etc.). The context, distortion (original and/or corrected), the distortion corrections, the original images, and/or the distorted images are stored in memory 655, provided by pipe 650 to memory 635, and ultimately used by lens warp process 625 to provide the user experience as discussed with respect to FIG. 6.

In some implementations, the context tracking is performed on the controller 110 while the warp is performed on the HMD 120. For example, this may be the case when warping images (e.g., camera streams) that are not transmitted to the controller 110 and that are merged with rendered streams provided by the controller 110. In some implementations, the HMD captures images of a real world scene and warps those images based on context tracking data provided by the controller 110. In some implementations, content to be displayed on the HMD is mixed reality (MR) content that includes video pass-through of the real world scene. Such images obtained by the HMD 120 need not be transmitted to the controller 110 and back, but instead may be distorted and corrected directly at the HMD 120, based on context information from the HMD 120 or the controller 110.

The distortion correction scheme employed by the controller 110 while the HMD 120 is in a connected-to-controller mode (FIG. 6) may differ from the distortion correction scheme employed by the HMD 120 while the HMD 120 is in standalone mode (FIG. 7). Such differences may reflect various implementation parameters. For example, the resources (e.g., power supply, memory, processor) of the controller 110 may be greater than those of the HMD 120 or there may otherwise be less of a requirement to conserve the controller 110 resources. In one example, in the connected-to-controller mode (FIG. 6), the controller applies an every image, full-computation scheme in which it determines a distortion correction using a full computation for every image of the user experience. In contrast, in this same system, the HMD 120 may apply an adaptive computation scheme that computes distortion corrections for less than all of the images of the user experience when in standalone mode (FIG. 7). Thus the same system in different connection modes can apply different distortion correction schemes.

In some implementations, the mode of the system switches back and forth, for example, between the standalone mode (FIG. 7) and the connected-to-controller mode (FIG. 6) during the user experience. Information, e.g., context history, distortion (original and/or corrected), the distortion corrections, original images, distorted images, and/or other information about the user experience may be shared between the controller 110 and the HMD 120 to facilitate transitioning between the modes during the user experience. For example, the HMD 120 may operate in standalone mode for a first period of time and then switch to a connected-to-controller mode for a second period of time. During the transition between these modes, the HMD 120 may share the eye tracking, gaze history, and/or context tracked during the first period with the controller 110 to allow the controller to use this historical information from the first period in determining the context it will use in its own distortion correction determinations for the second period.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method of providing a user experience on a head mounted device (HMD), the method comprising:
   at a device having a processor and a non-transitory computer-readable storage medium:
   tracking a context associated with a state of a user, the HMD, or content being viewed on the HMD during the user experience;
   determining distortion for images to be included in the user experience, the distortion determined based on a relationship between a lens and a display of the HMD and default position or gaze direction of an eye, the distortion determined to enable near-eye viewing of the content;
   determining corrected distortion by correcting the distortion based on the context during the user experience, wherein the distortion is corrected for near-eye viewing of the content involving a non-default position or gaze direction of the eye; and
   applying the corrected distortion to produce distorted versions of at least some of the images to be displayed on the display during the user experience.

2. The method of claim 1, wherein correcting the distortion is based on detecting a change in the context during the user experience.

3. The method of claim 1, wherein the corrected distortion is determined for only a subset of fewer than all of the images based on the context.

4. The method of claim 1, wherein a default corrected distortion is applied for a subset of fewer than all of the images based on the context.

5. The method of claim 1, wherein the corrected distortion for a prior image of the images is applied to a current image of the images based on the context.

6. The method of claim 1, wherein different distortion correction techniques are applied to different images.

7. The method of claim 6, wherein the different distortion correction techniques comprise a first correction technique based on determining a pupil position and a second correction technique based on a fixed pupil position.

8. The method of claim 1, wherein the context comprises a prediction of pupil position, eye state, eye gaze direction, or eye fixation based on monitoring images of an eye.

9. The method of claim 1, wherein the context comprises a brightness or type of the content being viewed on the HMD.

10. The method of claim 1, wherein the context comprises a position or movement of the HMD.

11. The method of claim 1, wherein the device and the HMD are separate devices.

12. The method of claim 11, wherein the device wirelessly receives the images from the HMD and transmits the corrected distortion to the HMD.

13. The method of claim 1, wherein the device is the HMD.

14. The method of claim 1, wherein the context comprises a connection mode of the HMD.

15. The method of claim 14, wherein the user experience is provided by the HMD and a separate device at different times during the user experience, wherein the context is based on whether the HMD or the separate device is providing the user experience.

16. The method of claim 1, wherein the context comprises an eye prescription.

17. The method of claim 1 wherein the context comprises data obtained from a sensor on the HMD.

18. The method of claim 1, wherein the content is three dimensional (3D) content or mixed reality (MR) content.

19. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
tracking a context associated with a state of a user, the HMD, or content being viewed on the HMD during the user experience;
determining distortion for images to be included in the user experience, the distortion determined based on a relationship between a lens and a display of the HMD and default position or gaze direction of an eye, the distortion determined to enable near-eye viewing of the content;
determining corrected distortion by correcting the distortion based on the context during the user experience, wherein correcting the distortion comprises selectively determining the corrected distortion for only a subset of fewer than all of the images or determining to apply different distortion correction techniques to different images, wherein the distortion is corrected for near-eye viewing of the content involving a non-default position or gaze direction of the eye; and
applying the corrected distortion to produce distorted versions of at least some of the images to be displayed on the display during the user experience.

20. A non-transitory computer-readable storage medium, storing program instructions computer-executable on a computer to perform operations comprising:
tracking a context associated with a state of a user, the HMD, or content being viewed on the HMD during the user experience;
determining distortion for images to be included in the user experience, the distortion determined based on a relationship between a lens and a display of the HMD and default position or gaze direction of an eye, the distortion determined to enable near-eye viewing of the content;
determining corrected distortion by correcting the distortion based on the context during the user experience, wherein correcting the distortion comprises selectively determining the corrected distortion for only a subset of fewer than all of the images or determining to apply different distortion correction techniques to different images, wherein the distortion is corrected for near-eye viewing of the content involving a non-default position or gaze direction of the eye; and
applying the corrected distortion to produce distorted versions of at least some of the images to be displayed on the display during the user experience.

* * * * *